United States Patent
Duan et al.

(10) Patent No.: US 10,040,696 B2
(45) Date of Patent: Aug. 7, 2018

(54) METHOD FOR PREPARING α-CALCIUM SULFATE HEMIHYDRATE WITH CALCIUM SULFATE DIHYDRATE

(71) Applicant: Shandong Borui New Material Technology Co., Ltd, Weifang, Shandong (CN)

(72) Inventors: Pengxuan Duan, Beijing (CN); Ying Li, Beijing (CN); Hongyu Wang, Qingzhou (CN); MingChen Yan, Qingzhou (CN)

(73) Assignee: Shandong Borui New Material Technology Co., Ltd, Qingzhou, Shandong Province (CN)

( * ) Notice: Subject to any disclaimer, the term of this patent is extended or adjusted under 35 U.S.C. 154(b) by 0 days.

(21) Appl. No.: 15/595,936

(22) Filed: May 15, 2017

(65) Prior Publication Data

US 2017/0247262 A1    Aug. 31, 2017

(30) Foreign Application Priority Data

Jul. 12, 2016    (CN) .......................... 2016 1 0547294

(51) Int. Cl.
*C01F 11/46*    (2006.01)
(52) U.S. Cl.
CPC .................................. *C01F 11/466* (2013.01)
(58) Field of Classification Search
CPC .............................. C01F 11/466; C01F 11/46
See application file for complete search history.

(56) References Cited

U.S. PATENT DOCUMENTS

| | | | | | |
|---|---|---|---|---|---|
| 3,579,300 | A | * | 5/1971 | Bloom et al. | ......... C01F 11/466 423/170 |
| 4,842,842 | A | * | 6/1989 | Kudo | ................... B01D 53/501 423/172 |
| 5,248,487 | A | * | 9/1993 | Bold | ..................... C01F 11/466 106/786 |

FOREIGN PATENT DOCUMENTS

| | | | | | |
|---|---|---|---|---|---|
| EP | 0306511 | B1 | * | 11/1992 | ........... C04B 11/024 |
| ES | 324794 | A1 | * | 2/1967 | ............ C01F 11/466 |
| GB | 1063839 | A | * | 3/1967 | ............ C01F 11/466 |

\* cited by examiner

*Primary Examiner* — Timothy C Vanoy
(74) *Attorney, Agent, or Firm* — Alan D. Kamrath; Kamrath IP Lawfirm, P.A.

(57) ABSTRACT

A method for preparing α-calcium sulfate hemihydrate with calcium sulfate dihydrate includes steps of: uniformly mixing the calcium sulfate dihydrate with an additive solution, and obtaining a mixture, wherein weight percentages of the calcium sulfate dihydrate and the additive solution in the mixture are respectively 90.00-95.00% and 5.00-10.00%, and the additive solution contains water, inorganic salt, organic salt, organic acid, surfactant, and seed crystal; rising a temperature of the mixture to 130-150° C., keeping for 20-120 minutes, and the calcium sulfate dihydrate in the mixture transforming to the α-calcium sulfate hemihydrate; drying the mixture after reaction at 105-160° C., and thereafter obtaining α-calcium sulfate hemihydrate product. The used calcium sulfate dihydrate can be natural raw materials and industrial by-products. The industrial by-products can be directly applied. Through utilizing characteristics of the industrial by-products, a dehydration reaction time and a drying time are shortened, and a product quality is obviously increased.

8 Claims, No Drawings

001, 696 B2

METHOD FOR PREPARING α-CALCIUM SULFATE HEMIHYDRATE WITH CALCIUM SULFATE DIHYDRATE

CROSS REFERENCE OF RELATED APPLICATION

The application claims priority under 35 U.S.C. 119(a-d) to CN 201610547294.9, filed Jul. 12, 2016.

BACKGROUND OF THE PRESENT INVENTION

Field of Invention

The present invention relates to a field of calcium sulfate hemihydrate material production method, and more particularly to a method for preparing α-calcium sulfate hemihydrate with calcium sulfate dihydrate.

Description of Related Arts

Calcium sulfate hemihydrate is an air-hardening material, and, after mixing with water, forms hardenite having certain strength. The calcium sulfate hemihydrate is widely applied in different industrial fields. For example, the calcium sulfate hemihydrate can be applied in the ceramic industry for preparing the ceramic mould, in the metallurgical industry for producing the precise casting mould, and in the building industry for producing the various building products and building materials. The calcium sulfate hemihydrate has two crystal forms, respectively α-form and β-form. The calcium sulfate hemihydrate, which is mainly β-form, has poor physical and mechanical properties with a compressive strength generally in a range of 5-15 MPa, while the calcium sulfate hemihydrate, which is mainly α-form, has good physical and mechanical properties with a compressive strength generally in a range of 45-100 MPa.

The calcium sulfate hemihydrate can be prepared through dehydrating the calcium sulfate dihydrate under certain conditions, namely $CaSO_4 \cdot 2H_2O \rightarrow CaSO_4 \cdot 0.5H_2O + 1.5H_2O$. The production process of the calcium sulfate hemihydrate has the low energy consumption and little environmental pollution, utilizes the solid wastes, and has a good development prospect. The calcium sulfate dihydrate can be natural raw materials and industrial by-product calcium sulfate dihydrate, wherein the industrial by-products are industrial solid wastes. The industrial by-product calcium sulfate dihydrate is mainly from desulfurized slags which are by-products of flue gas desulfurization, phosphorus slags which are by-products of phosphorus chemical industry, citric acid slags which are by-products of citric acid, and titanium slags which are by-products of titanium chemical industry. In China, the annual emissions of the industrial by-product calcium sulfate dihydrate are 130 million tons. Currently, the multipurpose utilization rate is low, and a large amount of industrial by-product calcium sulfate dihydrate is still stacked, which not only occupies the land and pollutes the atmosphere but also seriously pollutes the groundwater. Some industrial by-product calcium sulfate dihydrate having the high quality exists in the industrial by-products and is able to be comprehensively utilized as the high-quality industrial resources.

Three main methods for producing α-calcium sulfate hemihydrate are described as follows.

(1) Autoclave Method

Crushing the natural calcium sulfate dihydrate into material blocks of 20-50 mm; loading the material blocks into the autoclave through a metal frame or a small car, wherein the autoclave has two types of vertical autoclave and horizontal autoclave; introducing steam condensate or hot flue gas into the autoclave, and heating the material blocks to 50-70° C.; discharging the steam condensate or the hot flue gas, and closing the autoclave; introducing saturated steam into the autoclave, rising a temperature to 120-160° C., and maintaining a pressure; after 5-8 hours of autoclaving, dehydration and crystal transformation, the calcium sulfate dihydrate transforming into the α-calcium sulfate hemihydrate; moving the α-calcium sulfate hemihydrate out of the autoclave and drying, or drying the α-calcium sulfate hemihydrate in the autoclave.

The production cycle with the vertical autoclave is about 16-18 hours, while the production cycle with the horizontal autoclave is about 30-40 hours. The autoclave method is the conventional process and is relatively easy, but has the long production cycle and the relatively high production cost. Moreover, because the material blocks are not uniformly heated, dehydration, crystal transformation and drying of the material blocks are not uniform, causing the large fluctuation of the product quality and the relatively low product strength, wherein the strength is generally about 20-30 MPa.

(2) Hydrothermal Method

Grinding the natural calcium sulfate dihydrate into fine powders, adding the powders into an aqueous solution containing the crystal modifier, and forming a suspension liquid having a solid content not more than 30%; adding the suspension liquid into the vertical autoclave, constantly agitating the suspension liquid, and meanwhile heating the suspension liquid; evaporating water in the suspension liquid, forming steam, generating a pressure, and reaching the autoclaved condition; under the autoclaved condition with the temperature inside the autoclave reaches 120-160° C., reacting for 5-8 hours, and finishing dehydration and crystal transformation; then exhausting air, depressurizing, centrifugally dehydrating, washing, drying, grinding, and finally obtaining the product; crushing and grinding the product, then mixing with water, and forming slurry; adding an additive agent, which is able to facilitate the crystal transformation and also called crystal modifier, into the slurry, then loading the slurry into the autoclave with the steam jacket; agitating the slurry, and meanwhile introducing steam into the jacket and heating; the dihydrate gypsum transforming into the α-hemihydrate gypsum which is well crystallized; exhausting the steam, depressurizing, and discharging the slurry; processing the slurry with dehydration, washing, drying and grinding, and obtaining the high-strength α-hemihydrate gypsum powders.

The α-calcium sulfate hemihydrate prepared through the above method has the stable product quality and the high compressive strength which reaches 40-80 MPa. However, the hydrothermal method has the complex process, requires a few of production equipment and large investment, and has the relatively low production capability, the relatively low production efficiency and the high production cost.

(3) Ordinary Pressure Saline Solution Method

Mixing the ground calcium sulfate dihydrate with the saline solution in which the crystal modifier is added, then adding into the reactor, and boiling under the ordinary pressure condition; the calcium sulfate dihydrate transforming into the α-calcium sulfate hemihydrate; then dehydrating, washing, drying, and obtaining the α-calcium sulfate hemihydrate product. The above method does not require the pressure vessel, which reduces the equipment investment. However, the process condition is strict, the reaction time is relatively long, and the product strength is not high. The method is still in the laboratory testing stage and not able to be applied in the industrialized production.

For the above defects, after a long time of research and practice, the present invention is provided by the inventors. An object of the present invention is to provide a new processing method, which utilizes the calcium sulfate dihydrate to prepare the α-calcium sulfate hemihydrate. The used calcium sulfate dihydrate can be natural raw materials and industrial by-products. The industrial by-products can be directly applied. It is unnecessary to press the industrial by-products to form blocks, add water into the industrial by-products to form a suspension liquid or a saline solution, and separate the solid from the liquid after the reaction is finished. Through directly utilizing characteristics of the industrial by-products, such as the fine particles, the fast heat transfer rate, the uniform heating, the fast reaction rate, and the fast drying rate, the dehydration reaction time and the drying time are shortened, and the product quality is obviously increased.

SUMMARY OF THE PRESENT INVENTION

An object of the present invention is to provide a method for preparing α-calcium sulfate hemihydrate with calcium sulfate dihydrate, so as to solve the above technical problems.

Technical solutions of the present invention are described as follows.

A method for preparing α-calcium sulfate hemihydrate with calcium sulfate dihydrate comprises steps of: (1) uniformly mixing the calcium sulfate dihydrate with an additive solution, and obtaining a first mixture, wherein weight percentages of the calcium sulfate dihydrate and the additive solution in the mixture are respectively 90.00-95.00% and 5.00-10.00%; (2) rising a temperature of the first mixture to 120-160° C., keeping the temperature for 15-130 minutes, and obtaining a second mixture; and (3) drying the second mixture at 105-160° C., and thereafter obtaining α-calcium sulfate hemihydrate product.

Preferably, the additive solution contains water, inorganic salt, organic salt, organic acid, surfactant, and seed crystal.

Preferably, the inorganic salt is one member selected from a group consisting of potassium chloride, sodium sulfate, copper sulfate, magnesium sulfate, ferric sulfate, and aluminum sulfate.

Preferably, the organic salt is one member selected from a group consisting of sodium isobutyrate, sodium citrate, sodium tartrate, and sodium succinate.

Preferably, the organic acid is one member selected from a group consisting of citric acid, tartaric acid, succinic acid, malic acid, tricarballylic acid, and ethylenediaminetetraacetic acid.

Preferably, the surfactant is one member selected from a group consisting of sodium dodecylbenzenesulfonate, sodium alcohol ether sulfate, and sodium alkylarysulfonate.

Preferably, the seed crystal is a calcium sulfate hemihydrate crystal having a length-diameter ratio smaller than 1.

Preferably, the additive solution contains components by weight percentage of: the water: 61.10-94.35%; the inorganic salt: 0.22-12.00%; the organic salt: 0.35-4.50%; the organic acid: 2.00-15.00%; the surfactant: 0.08-0.40%; and the seed crystal: 3.00-7.00%.

Preferably, a main component of the calcium sulfate dihydrate is $CaSO_4 \cdot 2H_2O$, with a content larger than 90%; and, the calcium sulfate dihydrate has a fineness larger than 180 meshes and an attached water content of 0-10%.

Preferably, the calcium sulfate dihydrate can be natural calcium sulfate dihydrate and industrial by-product calcium sulfate dihydrate. The industrial by-product calcium sulfate dihydrate comprises: desulfurized slags, which are by-products of flue gas desulfurization; phosphorus slags, which are by-products of phosphorus chemical industry; citric acid slags, which are by-products of citric acid; and titanium slags, which are by-products of titanium chemical industry.

Compared with the prior art, the present invention has following beneficial effects.

Firstly, the calcium sulfate dihydrate can be natural raw materials and industrial by-products, and thus the raw material cost is low.

Secondly, the industrial by-products can be directly applied. It is unnecessary to press the industrial by-products to form blocks, add water into the industrial by-products to form a suspension liquid or a saline solution, and separate the solid from the liquid after the reaction is finished. Thus, the process steps are saved.

Thirdly, through directly utilizing characteristics of the industrial by-products, such as the fine particles, the fast heat transfer rate, the uniform heating, the fast reaction rate, and the fast drying rate, the dehydration reaction time and the drying time are shortened, and the product quality is obviously increased.

Fourthly, the production process is easy, the production efficiency is relatively high, and the production cost is low.

These and other objectives, features, and advantages of the present invention will become apparent from the following detailed description, the accompanying drawings, and the appended claims.

DETAILED DESCRIPTION OF THE PREFERRED EMBODIMENT

Example 1

Citric acid slags, which are by-products of citric acid, are adopted as raw materials. The citric acid slags contain 90% of $CaSO_4 \cdot 2H_2O$ and 10% of attached water, and have a fineness of 200 meshes.

A method for preparing α-calcium sulfate hemihydrate comprises steps of:

(1) preparing an additive solution, wherein the additive solution contains components by weight percentage of: water: 79.15%, wherein the water is steam condensate or tap water; magnesium sulfate: 6.50%; sodium isobutyrate: 2.45%; ethylenediaminetetraacetic acid: 4.70%; sodium dodecylbenzenesulfonate: 0.20%; and seed crystal: 7.00%;

(2) spraying the prepared additive solution on a citric acid slag conveyor, mixing citric acid slags with the additive solution and obtaining a mixture on the citric acid slag conveyor, wherein weight percentages of the citric acid slags and the additive solution in the mixture are respectively 94% and 6%;

(3) closing an outlet valve of a solid powder reactor; opening an inlet valve of the reactor; starting an agitating blade in the reactor; preheating by starting a heating system of the reactor; loading the mixture on the conveyor into the reactor, and then closing the inlet valve; uniformly agitating the mixture in the reactor by the agitating blade, and meanwhile gradually heating the mixture; evaporating attached water and crystal water in the mixture, forming steam, and rising a temperature of the mixture;

(4) when the temperature of the mixture in the reactor reaches above 95° C., opening a valve of a steam pipe which is connected to an interior of the reactor; introducing the steam into the steam pipe, and rising the temperature of the mixture; and, when the temperature of the mixture in the reactor reaches 140° C., keeping the temperature for 55 minutes;

(5) opening the outlet valve, discharging the mixture after reaction under pressure into a drying machine; after a pressure in the reactor decreases to an ordinary pressure, increasing a rotating speed of the agitating blade in the reactor, and accelerating discharging; and, after finishing discharging, closing the outlet valve; and (6) drying the mixture by the drying machine at 140° C. until the mixture is completely dried, namely a content of the attached water in the mixture is lower than 0.5%; and obtaining α-calcium sulfate hemihydrate product.

Under a dry condition, the α-calcium sulfate hemihydrate product prepared through the above method has a compressive strength ≥60 MPa.

Example 2

Natural calcium sulfate dihydrate is adopted as raw materials. The natural calcium sulfate dihydrate contains 95% of $CaSO_4 \cdot 2H_2O$ and 2% of attached water, with balance of impurities; and the natural calcium sulfate dihydrate has a fineness of 180 meshes.

A method for preparing α-calcium sulfate hemihydrate comprises steps of:

(1) preparing an additive solution, wherein the additive solution contains components by weight percentage of: water: 83.40%, wherein the water is steam condensate or tap water; aluminum sulfate: 4.30%; sodium citrate: 3.75%; tricarballylic acid: 2.90%; sodium alkylarysulfonate: 0.15%; and seed crystal: 5.50%;

(2) spraying the prepared additive solution on a natural calcium sulfate dihydrate conveyor, mixing natural calcium sulfate dihydrate with the additive solution, and obtaining a mixture on the natural calcium sulfate dihydrate conveyor, wherein weight percentages of the natural calcium sulfate dihydrate and the additive solution in the mixture are respectively 93% and 7%;

(3) closing an outlet valve of a solid powder reactor; opening an inlet valve of the reactor; starting an agitating blade in the reactor; preheating by starting a heating system of the reactor; loading the mixture on the conveyor into the reactor, and then closing the inlet valve; uniformly agitating the mixture in the reactor by the agitating blade, and meanwhile gradually heating the mixture; evaporating attached water and crystal water in the mixture, forming steam, and rising a temperature of the mixture;

(4) when the temperature of the mixture in the reactor reaches above 95° C., opening a valve of a steam pipe which is connected to an interior of the reactor; introducing the steam into the steam pipe, and rising the temperature of the mixture; and, when the temperature of the mixture in the reactor reaches 145° C., keeping the temperature for 65 minutes;

(5) after reaction is finished, opening the outlet valve, discharging the mixture under pressure into a drying machine; after a pressure in the reactor decreases to an ordinary pressure, increasing a rotating speed of the agitating blade in the reactor, and accelerating discharging; and, after finishing discharging, closing the outlet valve; and (6) drying the mixture by the drying machine at 140° C. until the mixture is completely dried, namely a content of the attached water in the mixture is lower than 0.5%; and obtaining α-calcium sulfate hemihydrate product.

Under a dry condition, the α-calcium sulfate hemihydrate product prepared through the above method has a compressive strength ≥55 MPa.

Example 3

The third example is different from the above examples in following aspects.

Firstly, desulfurized slags, which are by-products of flue gas desulfurization, are adopted as raw materials. The desulfurized slags contain 98% of $CaSO_4 \cdot 2H_2O$ and 1% of attached water, with balance of impurities; and the desulfurized slags have a fineness of 230 meshes.

Secondly, in the step (1), the additive solution contains components by weight percentage of: water: 94.35%, wherein the water is steam condensate or tap water; potassium chloride: 0.22%; sodium tartrate: 0.35%; citric acid: 2.00%; sodium alcohol ether sulfate: 0.08%; and seed crystal: 3.00%.

Thirdly, in the step (2), weight percentages of the desulfurized slags and the additive solution in the mixture are respectively 95% and 5%.

Fourthly, in the step (4), after "introducing the steam into the steam pipe, and rising the temperature of the mixture", when the temperature of the mixture in the reactor reaches 120° C., the temperature is kept for 130 minutes.

Fifthly, in the step (6), a drying temperature is 100° C.

Example 4

The fourth example is different from the above examples in following aspects.

Firstly, phosphorus slags, which are by-products of phosphorus chemical industry, are adopted as raw materials. The phosphorus slags contain 92% of $CaSO_4 \cdot 2H_2O$ and 6% of attached water, with balance of impurities; and the phosphorus slags have a fineness of 240 meshes.

Secondly, in the step (1), the additive solution contains components by weight percentage of: water: 61.1%, wherein the water is steam condensate or tap water; sodium sulfate: 12.0%; sodium succinate: 4.5%; tartaric acid: 15.0%; sodium alcohol ether sulfate: 0.4%; and seed crystal: 7.0%.

Thirdly, in the step (2), weight percentages of the phosphorus slags and the additive solution in the mixture are respectively 90% and 10%.

Fourthly, in the step (4), after "introducing the steam into the steam pipe, and rising the temperature of the mixture", when the temperature of the mixture in the reactor reaches 160° C., the temperature is kept for 15 minutes.

Fifthly, in the step (6), a drying temperature is 170° C.

Example 5

The fifth example is different from the above examples in following aspects.

Firstly, titanium slags, which are by-products of titanium chemical industry, are adopted as raw materials. The titanium slags contain 94% of $CaSO_4 \cdot 2H_2O$ and 4% of attached water, with balance of impurities; and the titanium slags have a fineness of 250 meshes.

Secondly, in the step (1), the additive solution contains components by weight percentage of: water: 75.0%, wherein the water is steam condensate or tap water; copper sulfate: 8.0%; sodium isobutyrate: 4.0%; malic acid: 6.7%; sodium dodecylbenzenesulfonate: 0.3%; and seed crystal: 6.0%.

Thirdly, in the step (2), weight percentages of the titanium slags and the additive solution in the mixture are respectively 92% and 8%.

Fourthly, in the step (4), after "introducing the steam into the steam pipe, and rising the temperature of the mixture", when the temperature of the mixture in the reactor reaches 158° C., the temperature is kept for 20 minutes.

Fifthly, in the step (6), a drying temperature is 158° C.

Example 6

The sixth example is different from the above examples in following aspects.

Firstly, natural calcium sulfate dihydrate is adopted as raw materials. The natural calcium sulfate dihydrate contains 95% of $CaSO_4 \cdot 2H_2O$ and 2% of attached water, with balance of impurities; and the natural calcium sulfate dihydrate has a fineness of 270 meshes.

Secondly, in the step (1), the additive solution contains components by weight percentage of: water: 80.0%, wherein the water is steam condensate or tap water; ferric sulfate: 6.0%; sodium tartrate: 2.9%; succinic acid: 7.0%; sodium alkylarysulfonate: 0.1%; and seed crystal: 4.0%.

Thirdly, in the step (2), weight percentages of the natural calcium sulfate dihydrate and the additive solution in the mixture are respectively 91% and 9%.

Fourthly, in the step (4), after "introducing the steam into the steam pipe, and rising the temperature of the mixture", when the temperature of the mixture in the reactor reaches 156° C., the temperature is kept for 25 minutes.

Fifthly, in the step (6), a drying temperature is 160° C.

Example 7

The seventh example is different from the above examples in following aspects.

Firstly, citric acid slags, which are by-products of citric acid, are adopted as raw materials. The citric acid slags contain 91% of $CaSO_4 \cdot 2H_2O$ and 9% of attached water; and the citric acid slags have a fineness of 300 meshes.

Secondly, in the step (1), the additive solution contains components by weight percentage of: water: 65.0%, wherein the water is steam condensate or tap water; ferric sulfate: 10.0%; sodium succinate: 4.4%; malic acid: 14.2%; sodium alcohol ether sulfate: 0.4%; and seed crystal: 6.0%.

Thirdly, in the step (2), weight percentages of the citric acid slags and the additive solution in the mixture are respectively 92% and 8%.

Fourthly, the step (4) comprises steps of: when the temperature of the mixture in the reactor reaches above 90° C., opening a valve of a steam pipe which is connected to an interior of the reactor; introducing the steam into the steam pipe, and rising the temperature of the mixture; and, when the temperature of the mixture in the reactor reaches 155° C., keeping the temperature for 30 minutes.

Fifthly, in the step (6), a drying temperature is 165° C.

Example 8

The eighth example is different from the above examples in following aspects.

Firstly, desulfurized slags, which are by-products of flue gas desulfurization, are adopted as raw materials. The desulfurized slags contain 93% of $CaSO_4 \cdot 2H_2O$ and 7% of attached water; and the desulfurized slags have a fineness of 325 meshes.

Secondly, in the step (1), the additive solution contains components by weight percentage of: water: 70.0%, wherein the water is steam condensate or tap water; sodium sulfate: 11.0%; sodium tartrate: 2.7%; tricarballylic acid: 11.0%; sodium alkylarysulfonate: 0.3%; and seed crystal: 5.0%.

Thirdly, in the step (2), weight percentages of the desulfurized slags and the additive solution in the mixture are respectively 93% and 7%.

Fourthly, the step (4) comprises steps of: when the temperature of the mixture in the reactor reaches above 100° C., opening a valve of a steam pipe which is connected to an interior of the reactor; introducing the steam into the steam pipe, and rising the temperature of the mixture; and, when the temperature of the mixture in the reactor reaches 154° C., keeping the temperature for 35 minutes.

Fifthly, in the step (6), a drying temperature is 160° C.

Example 9

The ninth example is different from the above examples in following aspects.

Firstly, phosphorus slags, which are by-products of phosphorus chemical industry, are adopted as raw materials. The phosphorus slags contain 96% of $CaSO_4 \cdot 2H_2O$ and 3% of attached water, with balance of impurities; and the phosphorus slags have a fineness of 400 meshes.

Secondly, in the step (1), the additive solution contains components by weight percentage of: water: 85.0%, wherein the water is steam condensate or tap water; potassium chloride: 2.0%; sodium succinate: 0.8%; ethylenediaminetetraacetic acid: 8.0%; sodium dodecylbenzenesulfonate: 0.2%; and seed crystal: 4.0%.

Thirdly, in the step (2), weight percentages of the phosphorus slags and the additive solution in the mixture are respectively 94% and 6%.

Fourthly, the step (4) comprises steps of: when the temperature of the mixture in the reactor reaches above 105° C., opening a valve of a steam pipe which is connected to an interior of the reactor; introducing the steam into the steam pipe, and rising the temperature of the mixture; and, when the temperature of the mixture in the reactor reaches 152° C., keeping the temperature for 40 minutes.

Fifthly, in the step (6), a drying temperature is 155° C.

Example 10

The tenth example is different from the above examples in following aspects.

Firstly, titanium slags, which are by-products of titanium chemical industry, are adopted as raw materials. The titanium slags contain 97% of $CaSO_4 \cdot 2H_2O$ and 2% of attached water, with balance of impurities; and the titanium slags have a fineness of 180 meshes.

Secondly, in the step (1), the additive solution contains components by weight percentage of: water: 90.0%, wherein the water is steam condensate or tap water; magnesium sulfate: 1.0%; sodium citrate: 0.9%; tartaric acid: 5.0%; sodium alkylarysulfonate: 0.1%; and seed crystal: 3.0%.

Thirdly, in the step (2), weight percentages of the titanium slags and the additive solution in the mixture are respectively 95% and 5%.

Fourthly, in the step (4), after "introducing the steam into the steam pipe, and rising the temperature of the mixture", when the temperature of the mixture in the reactor reaches 150° C., the temperature is kept for 45 minutes.

Fifthly, in the step (6), a drying temperature is 150° C.

Example 11

The eleventh example is different from the above examples in following aspects.

Firstly, natural calcium sulfate dihydrate is adopted as raw materials. The natural calcium sulfate dihydrate contains 99% of $CaSO_4.2H_2O$, with balance of impurities; and the natural calcium sulfate dihydrate has a fineness of 200 meshes.

Secondly, in the step (1), the additive solution contains components by weight percentage of: water: 93.4%, wherein the water is steam condensate or tap water; potassium chloride: 1.0%; sodium succinate: 0.5%; succinic acid: 2.0%; sodium alcohol ether sulfate: 0.1%; and seed crystal: 3.0%.

Thirdly, in the step (2), weight percentages of the natural calcium sulfate dihydrate and the additive solution in the mixture are respectively 90% and 10%.

Fourthly, in the step (4), after "introducing the steam into the steam pipe, and rising the temperature of the mixture", when the temperature of the mixture in the reactor reaches 148° C., the temperature is kept for 50 minutes.

Fifthly, in the step (6), a drying temperature is 145° C.

Example 12

The twelfth example is different from the above examples in following aspects.

Firstly, citric acid slags, which are by-products of citric acid, are adopted as raw materials. The citric acid slags contain 98% of $CaSO_4.2H_2O$ and 1% of attached water, with balance of impurities; and the citric acid slags have a fineness of 230 meshes.

Secondly, in the step (1), the additive solution contains components by weight percentage of: water: 89.8%, wherein the water is steam condensate or tap water; sodium sulfate: 2.0%; sodium tartrate: 1.0%; malic acid: 3.0%; sodium alkylarysulfonate: 0.2%; and seed crystal: 4.0%.

Thirdly, in the step (2), weight percentages of the citric acid slags and the additive solution in the mixture are respectively 91% and 9%.

Fourthly, in the step (4), after "introducing the steam into the steam pipe, and rising the temperature of the mixture", when the temperature of the mixture in the reactor reaches 146° C., the temperature is kept for 55 minutes.

Fifthly, in the step (6), a drying temperature is 140° C.

Example 13

The thirteenth example is different from the above examples in following aspects.

Firstly, desulfurized slags, which are by-products of flue gas desulfurization, are adopted as raw materials. The desulfurized slags contain 98% of $CaSO_4.2H_2O$ and 2% of attached water; and the desulfurized slags have a fineness of 325 meshes.

Secondly, in the step (1), the additive solution contains components by weight percentage of: water: 86.2%, wherein the water is steam condensate or tap water; copper sulfate: 3.0%; sodium citrate: 1.5%; tricarballylic acid: 4.0%; sodium dodecylbenzenesulfonate: 0.3%; and seed crystal: 5.0%.

Thirdly, in the step (2), weight percentages of the desulfurized slags and the additive solution in the mixture are respectively 92% and 8%.

Fourthly, the step (4) comprises steps of: when the temperature of the mixture in the reactor reaches above 100° C., opening a valve of a steam pipe which is connected to an interior of the reactor; introducing the steam into the steam pipe, and rising the temperature of the mixture; and, when the temperature of the mixture in the reactor reaches 144° C., keeping the temperature for 60 minutes.

Fifthly, in the step (6), a drying temperature is 135° C.

Example 14

The fourteenth example is different from the above examples in following aspects.

Firstly, phosphorus slags, which are by-products of phosphorus chemical industry, are adopted as raw materials. The phosphorus slags contain 95% of $CaSO_4.2H_2O$ and 3% of attached water, with balance of impurities; and the phosphorus slags have a fineness of 250 meshes.

Secondly, in the step (1), the additive solution contains components by weight percentage of: water: 82.6%, wherein the water is steam condensate or tap water; magnesium sulfate: 4.0%; sodium isobutyrate: 2.0%; tartaric acid: 5.0%; sodium alcohol ether sulfate: 0.4%; and seed crystal: 6.0%.

Thirdly, in the step (2), weight percentages of the phosphorus slags and the additive solution in the mixture are respectively 93% and 7%.

Fourthly, in the step (4), after "introducing the steam into the steam pipe, and rising the temperature of the mixture", when the temperature of the mixture in the reactor reaches 142° C., the temperature is kept for 65 minutes.

Fifthly, in the step (6), a drying temperature is 130° C.

Example 15

The fifteenth example is different from the above examples in following aspects.

Firstly, titanium slags, which are by-products of titanium chemical industry, are adopted as raw materials. The titanium slags contain 94% of $CaSO_4.2H_2O$ and 4% of attached water, with balance of impurities; and the titanium slags have a fineness of 270 meshes.

Secondly, in the step (1), the additive solution contains components by weight percentage of: water: 79.4%, wherein the water is steam condensate or tap water; ferric sulfate: 5.0%; sodium succinate: 2.5%; ethylenediaminetetraacetic acid: 6.0%; sodium alkylarysulfonate: 0.1%; and seed crystal: 6.0%.

Thirdly, in the step (2), weight percentages of the titanium slags and the additive solution in the mixture are respectively 94% and 6%.

Fourthly, in the step (4), after "introducing the steam into the steam pipe, and rising the temperature of the mixture", when the temperature of the mixture in the reactor reaches 138° C., the temperature is kept for 70 minutes.

Fifthly, in the step (6), a drying temperature is 125° C.

Example 16

The sixteenth example is different from the above examples in following aspects.

Firstly, natural calcium sulfate dihydrate is adopted as raw materials. The natural calcium sulfate dihydrate contains 95% of $CaSO_4.2H_2O$ and 5% of attached water; and the natural calcium sulfate dihydrate has a fineness of 300 meshes.

Secondly, in the step (1), the additive solution contains components by weight percentage of: water: 80.8%, wherein the water is steam condensate or tap water; aluminum sulfate: 6.0%; sodium tartrate: 3.0%; citric acid: 7.0%; sodium dodecylbenzenesulfonate: 0.2%; and seed crystal: 3.0%.

Thirdly, in the step (2), weight percentages of the natural calcium sulfate dihydrate and the additive solution in the mixture are respectively 95% and 5%.

Fourthly, in the step (4), after "introducing the steam into the steam pipe, and rising the temperature of the mixture", when the temperature of the mixture in the reactor reaches 136° C., the temperature is kept for 75 minutes.

Fifthly, in the step (6), a drying temperature is 120° C.

Example 17

The seventeenth example is different from the above examples in following aspects.

Firstly, citric acid slags, which are by-products of citric acid, are adopted as raw materials. The citric acid slags contain 93% of $CaSO_4.2H_2O$ and 6% of attached water, with balance of impurities; and the citric acid slags have a fineness of 325 meshes.

Secondly, in the step (1), the additive solution contains components by weight percentage of: water: 77.2%, wherein the water is steam condensate or tap water; potassium chloride: 7.0%; sodium citrate: 3.5%; succinic acid: 8.0%; sodium alcohol ether sulfate: 0.3%; and seed crystal: 4.0%.

Thirdly, in the step (2), weight percentages of the citric acid slags and the additive solution in the mixture are respectively 90% and 10%.

Fourthly, in the step (4), after "introducing the steam into the steam pipe, and rising the temperature of the mixture", when the temperature of the mixture in the reactor reaches 135° C., the temperature is kept for 80 minutes.

Fifthly, in the step (6), a drying temperature is 115° C.

Example 18

The eighteenth example is different from the above examples in following aspects.

Firstly, desulfurized slags, which are by-products of flue gas desulfurization, are adopted as raw materials. The desulfurized slags contain 93% of $CaSO_4.2H_2O$ and 7% of attached water; and the desulfurized slags have a fineness of 400 meshes.

Secondly, in the step (1), the additive solution contains components by weight percentage of: water: 77.2%, wherein the water is steam condensate or tap water; sodium sulfate: 8.0%; sodium isobutyrate: 0.4%; malic acid: 9.0%; sodium alkylarysulfonate: 0.4%; and seed crystal: 5.0%.

Thirdly, in the step (2), weight percentages of the desulfurized slags and the additive solution in the mixture are respectively 91% and 9%.

Fourthly, in the step (4), after "introducing the steam into the steam pipe, and rising the temperature of the mixture", when the temperature of the mixture in the reactor reaches 134° C., the temperature is kept for 85 minutes.

Fifthly, in the step (6), a drying temperature is 110° C.

Example 19

The nineteenth example is different from the above examples in following aspects.

Firstly, phosphorus slags, which are by-products of phosphorus chemical industry, are adopted as raw materials. The phosphorus slags contain 92% of $CaSO_4.2H_2O$ and 8% of attached water; and the phosphorus slags have a fineness of 180 meshes.

Secondly, in the step (1), the additive solution contains components by weight percentage of: water: 74.1%, wherein the water is steam condensate or tap water; copper sulfate: 9.0%; sodium succinate: 0.8%; tricarballylic acid: 10.0%; sodium dodecylbenzenesulfonate: 0.1%; and seed crystal: 6.0%.

Thirdly, in the step (2), weight percentages of the phosphorus slags and the additive solution in the mixture are respectively 92% and 8%.

Fourthly, in the step (4), after "introducing the steam into the steam pipe, and rising the temperature of the mixture", when the temperature of the mixture in the reactor reaches 132° C., the temperature is kept for 90 minutes.

Fifthly, in the step (6), a drying temperature is 105° C.

Example 20

The twentieth example is different from the above examples in following aspects.

Firstly, titanium slags, which are by-products of titanium chemical industry, are adopted as raw materials. The titanium slags contain 91% of $CaSO_4.2H_2O$ and 9% of attached water; and the titanium slags have a fineness of 180 meshes.

Secondly, in the step (1), the additive solution contains components by weight percentage of: water: 70.2%, wherein the water is steam condensate or tap water; magnesium sulfate: 10.0%; sodium tartrate: 1.6%; tartaric acid: 11.0%; sodium alcohol ether sulfate: 0.2%; and seed crystal: 7.0%.

Thirdly, in the step (2), weight percentages of the titanium slags and the additive solution in the mixture are respectively 93% and 7%.

Fourthly, in the step (4), after "introducing the steam into the steam pipe, and rising the temperature of the mixture", when the temperature of the mixture in the reactor reaches 130° C., the temperature is kept for 95 minutes.

Fifthly, in the step (6), a drying temperature is 166° C.

Example 21

The twenty-first example is different from the above examples in following aspects.

Firstly, natural calcium sulfate dihydrate is adopted as raw materials. The natural calcium sulfate dihydrate contains 90% of $CaSO_4.2H_2O$ and 10% of attached water; and the natural calcium sulfate dihydrate has a fineness of 230 meshes.

Secondly, in the step (1), the additive solution contains components by weight percentage of: water: 71.3%, wherein the water is steam condensate or tap water; ferric sulfate: 11.0%; sodium citrate: 2.4%; ethylenediaminetetraacetic acid: 12.0%; sodium alkylarysulfonate: 0.3%; and seed crystal: 3.0%.

Thirdly, in the step (2), weight percentages of the natural calcium sulfate dihydrate and the additive solution in the mixture are respectively 94% and 6%.

Fourthly, in the step (4), after "introducing the steam into the steam pipe, and rising the temperature of the mixture", when the temperature of the mixture in the reactor reaches 128° C., the temperature is kept for 100 minutes.

Fifthly, in the step (6), a drying temperature is 157° C.

Example 22

The twenty-second example is different from the above examples in following aspects.

Firstly, citric acid slags, which are by-products of citric acid, are adopted as raw materials. The citric acid slags contain 92% of CaSO$_4$.2H$_2$O and 6% of attached water, with balance of impurities; and the citric acid slags have a fineness of 240 meshes.

Secondly, in the step (1), the additive solution contains components by weight percentage of: water: 67.4%, wherein the water is steam condensate or tap water; aluminum sulfate: 12.0%; sodium isobutyrate: 3.2%; citric acid: 13.0%; sodium dodecylbenzenesulfonate: 0.4%; and seed crystal: 4.0%.

Thirdly, in the step (2), weight percentages of the citric acid slags and the additive solution in the mixture are respectively 95% and 5%.

Fourthly, in the step (4), after "introducing the steam into the steam pipe, and rising the temperature of the mixture", when the temperature of the mixture in the reactor reaches 126° C., the temperature is kept for 105 minutes.

Fifthly, in the step (6), a drying temperature is 148° C.

Example 23

The twenty-third example is different from the above examples in following aspects.

Firstly, desulfurized slags, which are by-products of flue gas desulfurization, are adopted as raw materials. The desulfurized slags contain 97% of CaSO$_4$.2H$_2$O and 3% of attached water; and the desulfurized slags have a fineness of 250 meshes.

Secondly, in the step (1), the additive solution contains components by weight percentage of: water: 76.2%, wherein the water is steam condensate or tap water; potassium chloride: 0.5%; sodium succinate: 4.2%; succinic acid: 14.0%; sodium alcohol ether sulfate: 0.1%; and seed crystal: 5.0%.

Thirdly, in the step (2), weight percentages of the desulfurized slags and the additive solution in the mixture are respectively 90% and 10%.

Fourthly, in the step (4), after "introducing the steam into the steam pipe, and rising the temperature of the mixture", when the temperature of the mixture in the reactor reaches 125° C., the temperature is kept for 100 minutes.

Fifthly, in the step (6), a drying temperature is 139° C.

Example 24

The twenty-fourth example is different from the above examples in following aspects.

Firstly, phosphorus slags, which are by-products of phosphorus chemical industry, are adopted as raw materials. The phosphorus slags contain 96% of CaSO$_4$.2H$_2$O and 4% of attached water; and the phosphorus slags have a fineness of 400 meshes.

Secondly, in the step (1), the additive solution contains components by weight percentage of: water: 67.7%, wherein the water is steam condensate or tap water; sodium sulfate: 10.5%; sodium tartrate: 0.6%; malic acid: 15.0%; sodium alkylarysulfonate: 0.2%; and seed crystal: 6.0%.

Thirdly, in the step (2), weight percentages of the phosphorus slags and the additive solution in the mixture are respectively 91% and 9%.

Fourthly, in the step (4), after "introducing the steam into the steam pipe, and rising the temperature of the mixture", when the temperature of the mixture in the reactor reaches 124° C., the temperature is kept for 115 minutes.

Fifthly, in the step (6), a drying temperature is 124° C.

Example 25

The twenty-fifth example is different from the above examples in following aspects.

Firstly, titanium slags, which are by-products of titanium chemical industry, are adopted as raw materials. The titanium slags contain 92% of CaSO$_4$.2H$_2$O and 5% of attached water, with balance of impurities; and the titanium slags have a fineness of 300 meshes.

Secondly, in the step (1), the additive solution contains components by weight percentage of: water: 78.4%, wherein the water is steam condensate or tap water; copper sulfate: 6.5%; sodium citrate: 3.3%; tricarballylic acid: 4.5%; sodium dodecylbenzenesulfonate: 0.3%; and seed crystal: 7.0%.

Thirdly, in the step (2), weight percentages of the titanium slags and the additive solution in the mixture are respectively 92% and 8%.

Fourthly, in the step (4), after "introducing the steam into the steam pipe, and rising the temperature of the mixture", when the temperature of the mixture in the reactor reaches 122° C., the temperature is kept for 120 minutes.

Fifthly, in the step (6), a drying temperature is 113° C.

Example 26

The twenty-sixth example is different from the above examples in following aspects.

Firstly, natural calcium sulfate dihydrate is adopted as raw materials. The natural calcium sulfate dihydrate contains 94% of CaSO$_4$.2H$_2$O and 6% of attached water; and the natural calcium sulfate dihydrate has a fineness of 325 meshes.

Secondly, in the step (1), the additive solution contains components by weight percentage of: water: 78.1%, wherein the water is steam condensate or tap water; magnesium sulfate: 8.3%; sodium isobutyrate: 2.7%; tartaric acid: 7.5%; sodium alcohol ether sulfate: 0.4%; and seed crystal: 3.0%.

Thirdly, in the step (2), weight percentages of the natural calcium sulfate dihydrate and the additive solution in the mixture are respectively 93% and 7%.

Fourthly, in the step (4), after "introducing the steam into the steam pipe, and rising the temperature of the mixture", when the temperature of the mixture in the reactor reaches 121° C., the temperature is kept for 125 minutes.

Fifthly, in the step (6), a drying temperature is 106° C.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for preparing α-calcium sulfate hemihydrate with calcium sulfate dihydrate, comprising steps of:
    (1) uniformly mixing the calcium sulfate dihydrate with an additive solution, and obtaining a first mixture, wherein weight percentages of the calcium sulfate dihydrate and the additive solution in the first mixture are respectively 90.00-95.00% and 5.00-10.00%;
    (2) rising a temperature of the first mixture to 120-160° C., keeping the temperature for 15-130 minutes, and obtaining a second mixture; and
    (3) drying the second mixture at 100-170° C., and thereafter obtaining α-calcium sulfate hemihydrate product;

wherein the additive solution contains water, inorganic salt, organic salt, organic acid, surfactant, and seed crystal, and the additive solution contains components by weight percentage of: the water: 61.10-94.35%; the inorganic salt: 0.22-12.00%; the organic salt: 0.35-4.50%; the organic acid: 2.00-15.00%; the surfactant: 0.08-0.40%; and the seed crystal: 3.00-7.00%.

2. The method for preparing the α-calcium sulfate hemihydrate with the calcium sulfate dihydrate, as recited in claim 1, wherein the inorganic salt is one member selected from a group consisting of potassium chloride, sodium sulfate, copper sulfate, magnesium sulfate, ferric sulfate, and aluminum sulfate.

3. The method for preparing the α-calcium sulfate hemihydrate with the calcium sulfate dihydrate, as recited in claim 1, wherein the organic salt is one member selected from a group consisting of sodium isobutyrate, sodium citrate, sodium tartrate, and sodium succinate.

4. The method for preparing the α-calcium sulfate hemihydrate with the calcium sulfate dihydrate, as recited in claim 1, wherein the organic acid is one member selected from a group consisting of citric acid, tartaric acid, succinic acid, malic acid, tricarballylic acid, and ethylenediaminetetraacetic acid.

5. The method for preparing the α-calcium sulfate hemihydrate with the calcium sulfate dihydrate, as recited in claim 1, wherein the surfactant is one member selected from a group consisting of sodium dodecylbenzenesulfonate, sodium alcohol ether sulfate, and sodium alkylarysulfonate.

6. The method for preparing the α-calcium sulfate hemihydrate with the calcium sulfate dihydrate, as recited in claim 1, wherein the seed crystal is a calcium sulfate hemihydrate crystal having a length-diameter ratio smaller than 1.

7. The method for preparing the α-calcium sulfate hemihydrate with the calcium sulfate dihydrate, as recited in claim 1, wherein a main component of the calcium sulfate dihydrate is $CaSO_4.2H_2O$, with a content larger than 90%; and, the calcium sulfate dihydrate has a fineness ≥180 meshes and an attached water content of 0-10%.

8. The method for preparing the α-calcium sulfate hemihydrate with the calcium sulfate dihydrate, as recited in claim 7, wherein the calcium sulfate dihydrate is natural calcium sulfate dihydrate or industrial by-product calcium sulfate dihydrate; and the industrial by-product calcium sulfate dihydrate comprises: desulfurized slags, which are by-products of flue gas desulfurization; phosphorus slags, which are by-products of phosphorus chemical industry; citric acid slags, which are by-products of citric acid; and titanium slags, which are by-products of titanium chemical industry.

* * * * *